US012590857B2

(12) United States Patent
Uehlin et al.

(10) Patent No.: US 12,590,857 B2
(45) Date of Patent: Mar. 31, 2026

(54) COPLANAR DIFFERENTIAL PRESSURE TRANSDUCER

(71) Applicant: Endress+Hauser SE+Co. KG, Maulburg (DE)

(72) Inventors: Thomas Uehlin, Schopfheim (DE); Michael Hügel, Offenburg (DE); Florian Gutmann, Münstertal (DE)

(73) Assignee: Endress+Hauser SE+Co. KG, Maulburg (DE)

( * ) Notice: Subject to any disclaimer, the term of this patent is extended or adjusted under 35 U.S.C. 154(b) by 365 days.

(21) Appl. No.: 18/257,071

(22) PCT Filed: Nov. 26, 2021

(86) PCT No.: PCT/EP2021/083082
§ 371 (c)(1),
(2) Date: Jun. 12, 2023

(87) PCT Pub. No.: WO2022/128397
PCT Pub. Date: Jun. 23, 2022

(65) Prior Publication Data
US 2024/0044733 A1 Feb. 8, 2024

(30) Foreign Application Priority Data
Dec. 14, 2020 (DE) ..................... 10 2020 133 349.8

(51) Int. Cl.
*G01L 13/02* (2006.01)
*G01L 19/00* (2006.01)

(52) U.S. Cl.
CPC ........ *G01L 13/026* (2013.01); *G01L 19/0046* (2013.01)

(58) Field of Classification Search
CPC ..... G01L 13/02; G01L 13/025; G01L 13/026; G01L 19/0046; G01L 19/0645
See application file for complete search history.

(56) References Cited

U.S. PATENT DOCUMENTS 4,507,972 A * 4/1985 Morita .................. G01L 9/0072
73/725
4,745,810 A 5/1988 Pierce et al.
(Continued)

FOREIGN PATENT DOCUMENTS

CN 203455132 U 2/2014
CN 106062526 A 10/2016
(Continued)

OTHER PUBLICATIONS

Mating dimensions between differential pressure (type) measuring instruments and flanged-on shut-off devices up to 413 bar (41,3 MPa), IEC 61518:2001(E), International Electrotechnical Commission, pp. 1-8 (2001).
(Continued)

*Primary Examiner* — Herbert K Roberts
(74) *Attorney, Agent, or Firm* — Christopher R. Powers; Endress+Hauser (USA) Holding, Inc.

(57) ABSTRACT

A coplanar differential pressure transducer includes a measuring unit with two separating diaphragms facing the process and a transducer chamber, wherein the measuring unit is configured as a process connection for a hardware interface, wherein, in an end face of a base body of the process connection facing the process, is a disk-shaped recess downstream of each separating diaphragm, each disk-shaped recess having different radii, which intersect in an ellipsoidal structure, wherein two insert disks corresponding to each ellipsoidal disk-shaped recess are mountable in the ellipsoidal disk-shaped recesses and are configured such that the process connection can be adapted to the hardware interface of a customer connection.

10 Claims, 5 Drawing Sheets

(56) References Cited

U.S. PATENT DOCUMENTS

| | | | |
|---|---|---|---|
| 7,231,831 B1 | 6/2007 | Lancaster | |
| 2008/0223140 A1* | 9/2008 | Broden ................. | G01L 13/025 |
| | | | 73/718 |
| 2010/0307254 A1 | 12/2010 | Klosinski et al. | |
| 2014/0165735 A1* | 6/2014 | Kurtz ................... | G01L 9/0052 |
| | | | 73/715 |

FOREIGN PATENT DOCUMENTS

| | | |
|---|---|---|
| DE | 69629388 T2 | 7/2004 |
| DE | 102012113042 A1 | 6/2014 |
| DE | 102014102719 A1 | 9/2015 |
| DE | 102016117989 A1 | 3/2018 |
| EP | 2901124 A1 | 8/2015 |
| WO | 2018165122 A1 | 9/2018 |
| WO | 2018165263 A1 | 9/2018 |

OTHER PUBLICATIONS

Product Data Sheet: Rosemount Pressure Transmitter 3051, 00813-0100-4001, Rev FA, Emerson Electric Co., 99. 1-15 (2004).
Layout Drawing: Rosemount 30511C Rev. 5 Pressure Transmitter, Coplanar Flange Process Connections, 03151-6003, 5 sheets.

* cited by examiner

COPLANAR DIFFERENTIAL PRESSURE TRANSDUCER

CROSS-REFERENCE TO RELATED APPLICATIONS

The present application is related to and claims the priority benefit of German Patent Application No. 10 2020 133 349.8, filed on Dec. 14, 2020, and International Patent Application No. PCT/EP2021/083082, filed Nov. 26, 2021, the entire contents of which are incorporated herein by reference.

TECHNICAL FIELD

The invention relates to a coplanar differential pressure transducer. The differential pressure transducer according to the invention is preferably used in the field of automation technology.

BACKGROUND

Substantial components of differential pressure gages are a measuring unit and a transducer chamber in which a pressure difference measuring cell with a pressure-sensitive element is arranged. Differential pressure gages are used in particular for continuously measuring pressure differences in measurement media, for example in liquids, vapors, gases and dusts. From the differential pressure, for example, the fill level of a filling material in a tank or the flow of a measurement medium through a pipe conduit can be determined.

A silicon chip is usually used as the pressure-sensitive element. In order to achieve a good measurement sensitivity, a differential pressure transducer preferably operates in a range close to a critical limit value for the pressure (nominal pressure). If the critical limit value is exceeded, there is a risk of the chip being destroyed. Since silicon chips in particular have a relatively low overload resistance, overload protection is usually assigned to a differential pressure transducer. This is preferably designed such that it impairs the measurement sensitivity and the measurement accuracy of the pressure-sensitive element as little as possible.

WO 2018/165122 A1 discloses a differential pressure transducer of coplanar construction, in which the pressure inlets with separating diaphragm and overload diaphragm are arranged in one plane, specifically in the end region facing the process. This is a so-called double diaphragm system. The coplanar differential pressure transducer is configured such that it can be connected to a standardized 3051 interface.

SUMMARY

The object of the invention is to propose a differential pressure transducer which can be adapted to different customer connections.

The object is achieved by a coplanar differential pressure transducer comprising a measuring unit having two separating diaphragms facing the process and a transducer chamber, wherein two pressures are applied to the separating diaphragms, said pressures being hydraulically transmitted via a corresponding capillary system to a pressure-sensitive measuring element which is arranged in the transducer chamber. In its end region facing the process, the measuring unit is designed as a process connection for a hardware interface of a customer connection. In the end face of the base body of the process connection facing the process, a disk-shaped recess is provided upstream of each of the two separating diaphragms. Each of the two disk-shaped recesses is in each case in the form of two circles, with different radii, which intersect in an ellipsoidal structure. Two insert disks having an opening and corresponding to the ellipsoidal disk-shaped recesses are provided. Said insert disks can be mounted in the ellipsoidal disk-shaped recesses and are designed such that the process connection can be adapted to the hardware interface of the customer connection.

According to an embodiment, at least two pairs of different insert disks are provided, which are designed such that the process connection can be mounted on at least two different hardware interfaces, in particular on at least two different standard hardware interfaces, of corresponding customer connections.

Furthermore, it is proposed that the ellipsoidal disk-shaped recesses and the corresponding insert disks are dimensioned such that the circumferential weld seams are located outside the separating diaphragms for mounting the insert disks in the ellipsoidal disk-shaped recesses. Preferably, the two ellipsoidal disk-shaped recesses are arranged fully symmetrically to one another.

It is further proposed that the two ellipsoidal disk-shaped recesses are arranged such that they are adjacent to one another with the two larger dimensioned radii, while they are aligned with the two smaller radii with two opposite outer edges of the process connection.

In the context of the invention, it is provided that, in the case of two insert disks that correspond to a first hardware interface, the preferably circular opening is in each case located in the region of the larger radius. The first hardware interface is preferably a 3051 interface. Here, it is also provided that a circumferential annular groove is arranged around each of the two circular openings. This serves to receive a seal. The second hardware interface can be, for example, an IEC interface. It is provided here that, in the case of two insert disks that correspond to a first hardware interface, the preferably circular opening is located in each case in the region of the smaller radius.

A further embodiment of the coplanar differential pressure transducer according to the invention provides that the ellipsoidal disk-shaped recesses are sealed with corresponding blind insert disks. By fastening the blind insert discs in the ellipsoidal recesses, these accesses are sealed in a pressure-tight and gas-tight manner. The pressures to be measured arrive at the respective separating diaphragm, for example via laterally extending bores at the process connection.

BRIEF DESCRIPTION OF THE DRAWINGS

The invention is explained in greater detail with reference to the following figures. In the figures:

FIG. 1b shows, in parts, an exploded view of the differential pressure transducer shown in FIG. 1a;

FIG. 2b shows a detail of the longitudinal section through the schematically illustrated differential pressure transducer with the coplanar adapter according to FIG. 2a;

DETAILED DESCRIPTION

Figure 1A:
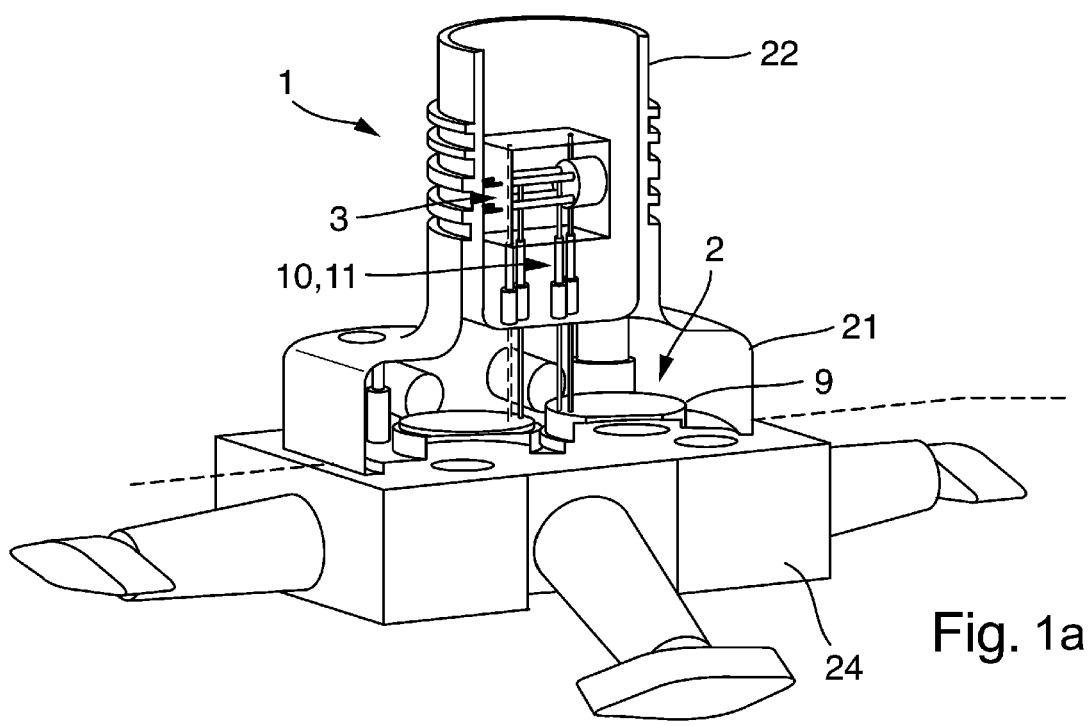
FIG. 1a shows a partial longitudinal section through a perspective view of a differential pressure transducer according to the present disclosure, which shows the substantial components.
Figure 1B:
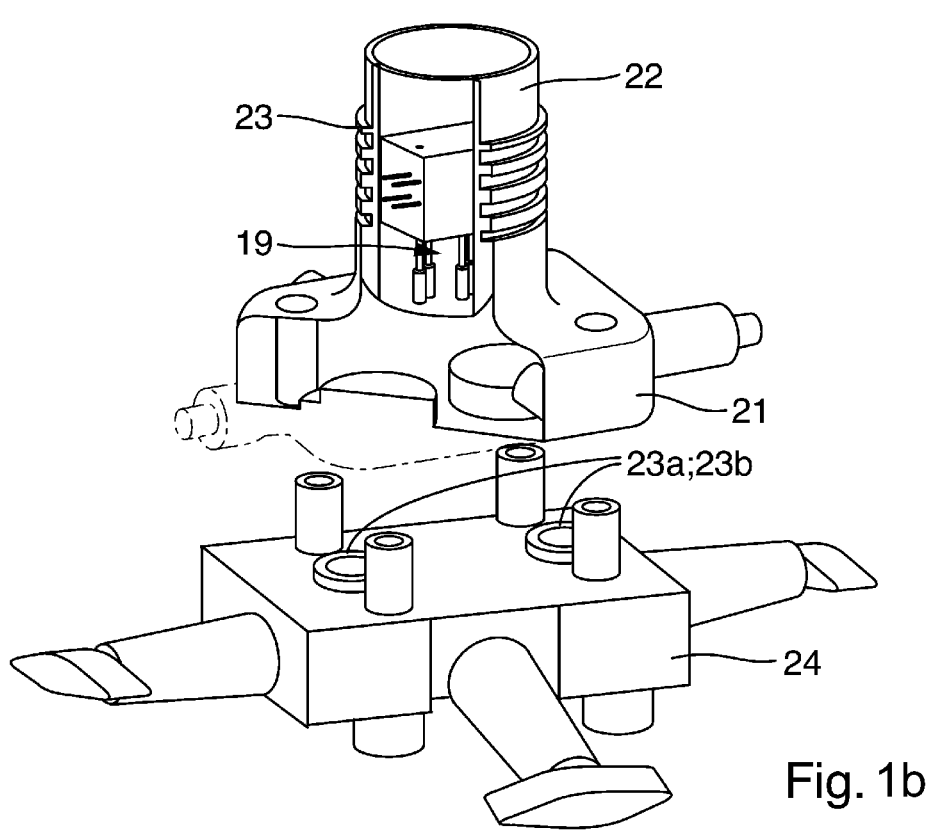

FIG. 1*a* shows a perspective view of a differential pressure transducer 1, wherein some of the components arranged in the interior can be seen as a result of a partial longitudinal section. FIG. 1*b* is a partial exploded view of the differential pressure transducer 1 shown in FIG. 1*a*.

The differential pressure transducer 1 consists of a pressure-tight or gas-tight unit which is formed from the process connection 21 and the housing adapter 22. Substantial components of the differential pressure transducer 1 are the measuring unit 2 integrated in the process connection 21 and a transducer chamber 3 in which a differential pressure measuring cell 12 with a pressure-sensitive measuring element 13 is located.

In a region of the measuring unit 2 facing the process, two separating diaphragms 5*a*, 5*b* that are adjacent, i.e., coplanar, in one plane are provided. During the measuring operation of the differential pressure transducer 1, the pressures p1, p2 are applied to the separating diaphragms 5*a*, 5*b*, the difference dp of which is to be measured or determined. The pressure is supplied via the customer connection/valve block 24, which comprises the customer interfaces 23*a*, 23*b*. Depending on the standard used, these customer interfaces 23*a*, 23*b* can vary in diameter and relative distance from one another. Known standards are, for example, the 3051 Standard used primarily in the USA for connecting pressure sensors or the IEC Standard used in many parts of the world. In the 3051 Standard, the customer interfaces 23*a*, 23*b* have a smaller relative distance from one another and a larger diameter than is the case with the customer interfaces 23*a*, 23*b* in the IEC Standard.

The two pressures p1, p2 are hydraulically conducted from the separating diaphragms 5*a*, 5*b* via a corresponding capillary system 10*a*, 10*b*, 11*a*, 11*b* to two opposing pressurization surfaces 13*a*, 13*b* of the pressure-sensitive measuring element 13. The capillary system can be capillary bores in a base body 9, for example the base bodies 9 of measuring unit 2 and wall chamber 3, or also in an intermediate body. Alternatively, in a separate variant of measuring unit and transducer chamber, the capillary system can also consist at least in part of capillary tubes. The measuring mechanism 2 is symmetrical, preferably fully symmetrical. This results in considerable advantages during manufacture.

In order to connect the pressure measuring transducer 1 and the customer connection 24 to one another via bolts (not shown), in its end region facing the process the measuring unit 2 is designed as a process connection 21. By means of the coplanar adapter according to the invention, which is provided on or in the end region of the process connection

21 facing the process, it is now possible to easily adjust or adapt a standard process connection 21 to different customer connections 24*a*, 24*b*.

Figure 2A:
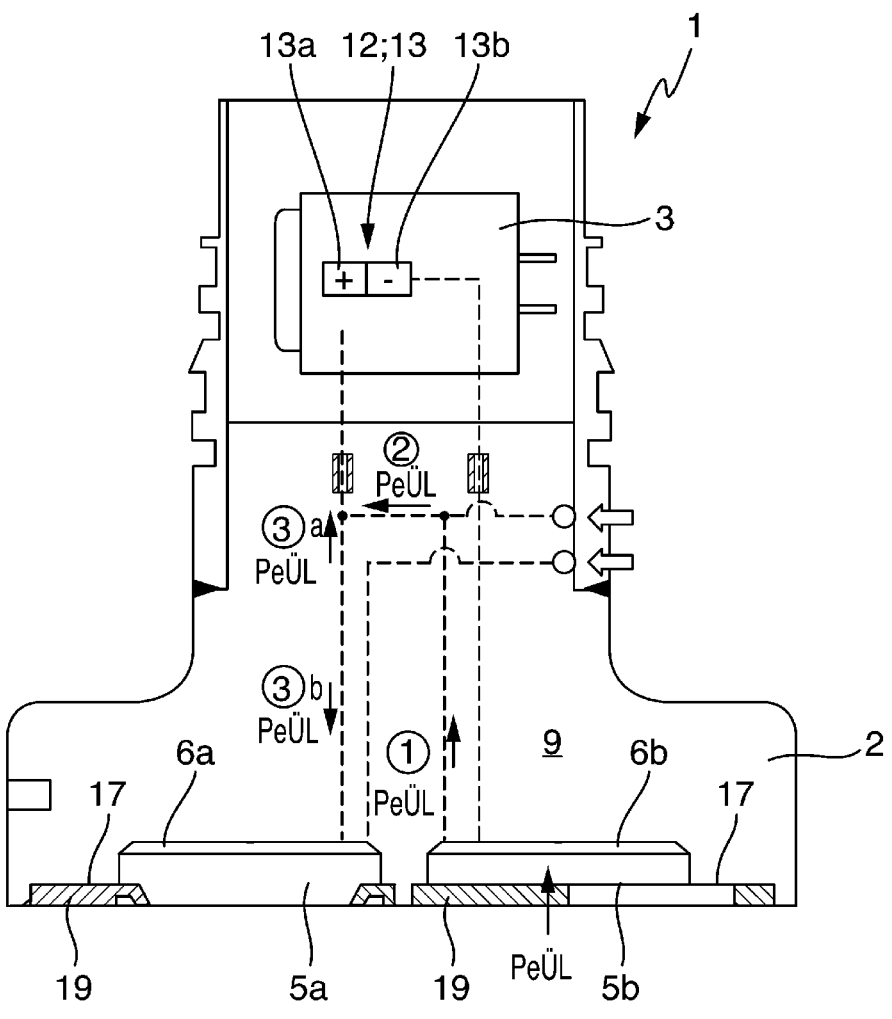
FIG. 2a shows a longitudinal section through a schematically illustrated differential pressure transducer with the coplanar adapter according to the present disclosure.
Figure 2B:
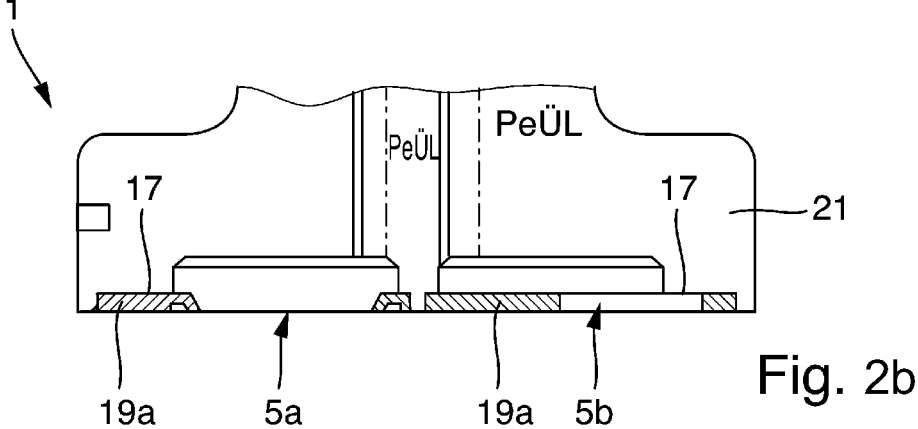

The coplanar adapter for adapting a standard process adapter 21 to different customer interfaces 24*a*, 24*b* can be seen in FIGS. 2*a*, 2*b* and 3*a*-3*d* in different embodiments and representations. FIG. 2*b* shows a partial longitudinal section through the end region of the process connection 21 facing the process. In a region of the end face of the base body 9 of the process connection 21 facing the process, a disk-shaped recess 17 is provided upstream of each of the two separating diaphragms 5*a*, 5*b*. Each of the two disk-shaped recesses is in each case in the form of two circles, with different radii Ra; Rb, which intersect in an ellipsoidal structure. Corresponding insert disks 19*a* or 19*b*, which have an opening 26*a* or 26*b*, are inserted into the two ellipsoidal disk-shaped recesses 17. The pressures p1, p2 arrive at the separation diaphragms 5*a*, 5*b* via these openings 26*a*; 26*b*. Corresponding insert disks 19*a*, 19*b* means that the form and dimensions of the insert disks 19*a*, 19*b* are adapted to the ellipsoidal disk-shaped recesses 17. This can be clearly seen by way of example in FIG. 3*a* and FIG. 3*d*. The insertion disks 19*a*, 19*b* are configured such that the process connection 21 can be adapted to the hardware interface 23*a*; 23*b* of the customer connection 24*a*; 24*b*.

For each customer connection 24*a*, 24*b*, there is a matching pair of insert disks 19*a*, 19*b*, via which the process connection 21 can be mounted on at least two different hardware interfaces 23*a*, 23*b* of corresponding customer terminals 24*a*, 24*b*. Since the customer connections 24*a*, 24*b* are also largely standardized, it is sufficient to explicitly name two customer connections 24*a*, 24*b*: the 3051 Standard and the IEC Standard. Both have been mentioned and described in more detail above.

The insert disks 19*a*, 19*b* required for the customer connection 24*a*, 24*b* are mounted in the ellipsoidal disk-shaped recesses 17 in such a way that the circumferential weld seams 25 for mounting the insert disks 19*a*; 19*b* lie in the ellipsoidal disk-shaped recesses 17 outside the separating diaphragms 5*a*, 5*b*. This is important to ensure that the function of the separating diaphragms 5*a*, 5*b* is not impaired by the temperature effects during the welding process. The course of the weld seams is clearly visible in FIG. 3*d*.

The two ellipsoidal disk-shaped recesses 17, like the selected insert disks 19*a*; 19*b*, are arranged fully symmetrically with respect to one another.

Figure 3A:
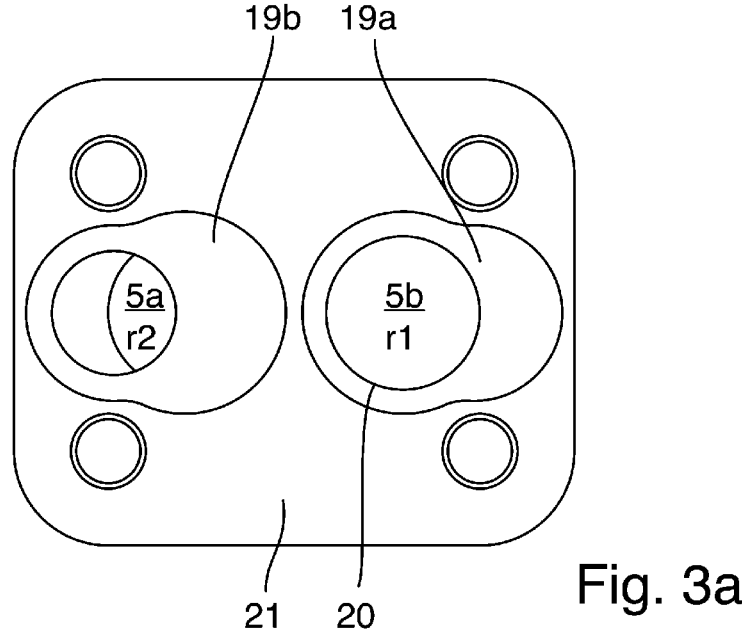
FIG. 3*a* shows a plan view of the lower end face of the process adapter.
Figures 3B, 3C:
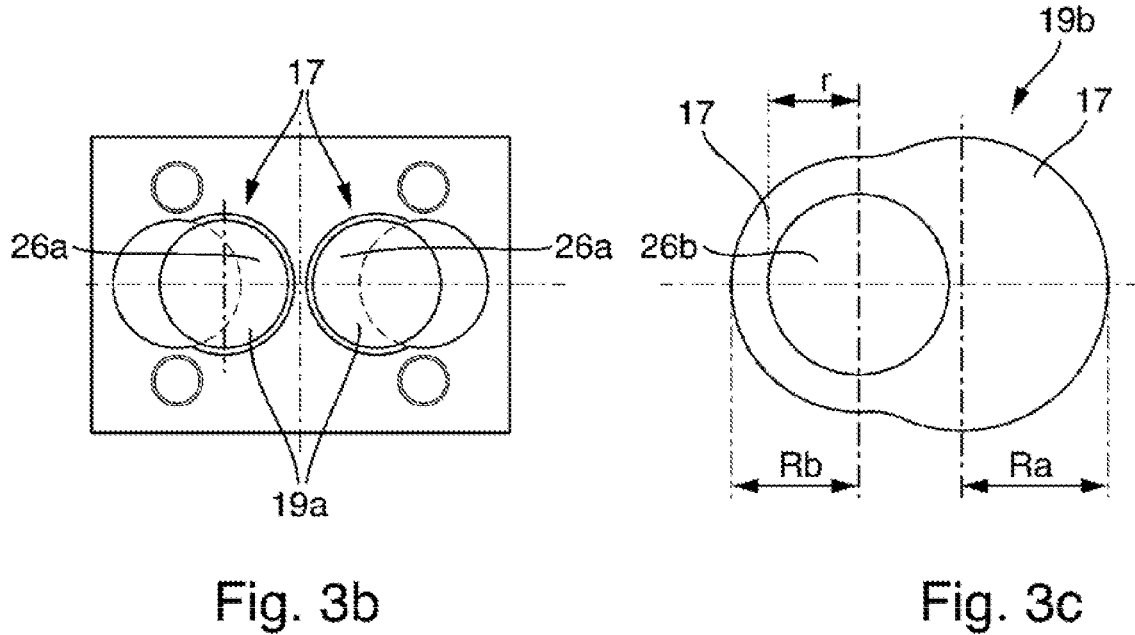
FIG. 3*b* shows an outlined representation of the position of the disk-shaped recesses with the insertion disks for a customer interface.
FIG. 3*c* shows an outlined partial representation of the position of the disk-shaped recesses with the left insert disk for a further customer interface.
Figure 3D:
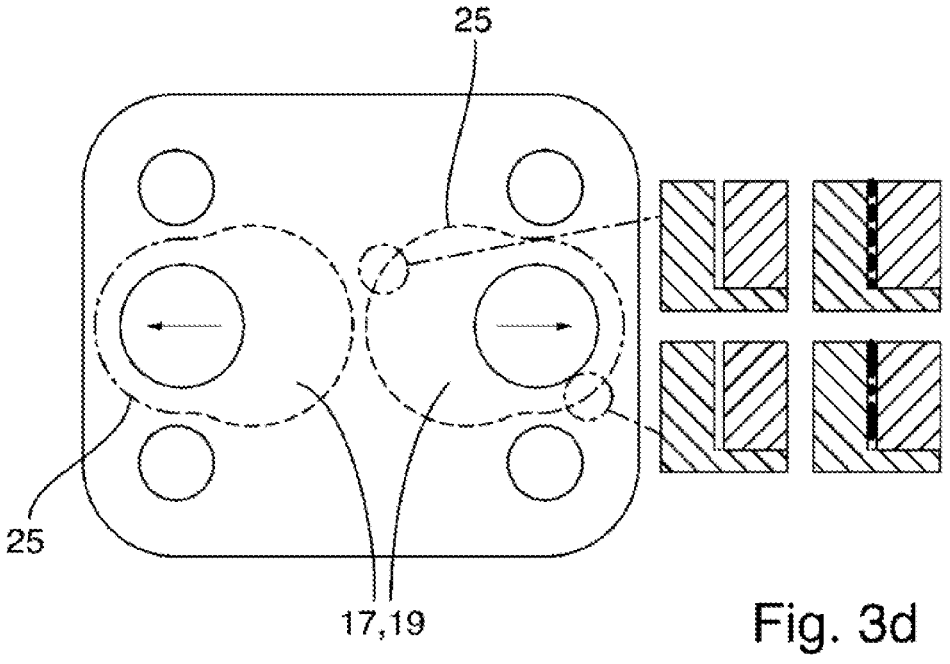
FIG. 3*d* shows a plan view of the end face of the process adapter with insert disks for the further customer interface shown in FIG. 3*c*.

FIG. 3*b* shows that the two ellipsoidal disk-shaped recesses are arranged such that they are adjacent to one another with the two larger radii Ra, while they are aligned with the two smaller radii Rb with two opposite outer edges of the process connection 21. The preferably circular opening 26*a* is in each case located in the region of the larger radius Ra. The dimensions of the recesses 17 and in particular of the insert disks 19*a* are selected such that the process connection 21 can be connected to a hardware interface 23*a*, which is a 3051 interface. Each of the two circular openings 26*a* having a radius r1 is surrounded by a circumferential annular groove 20. This serves for receiving a seal or sealing material.

FIG. 3*c* shows the left-hand recess 17 and an insert disk 19*b* that corresponds to another hardware interface 23*b*. The right recess with the insert disk 19*b* is arranged coplanarly thereto, but is not shown in FIG. 3*c*. Here, the preferably circular opening 26*b* is located in the region of the smaller radius' Rb of the insert disk 19*b*. The circular opening has a radius r2. Preferably, the insert disks 19*b* are designed such that the process adapter 21 can be docked to a customer connection 24 according to the IEC Standard.

Figure 4:
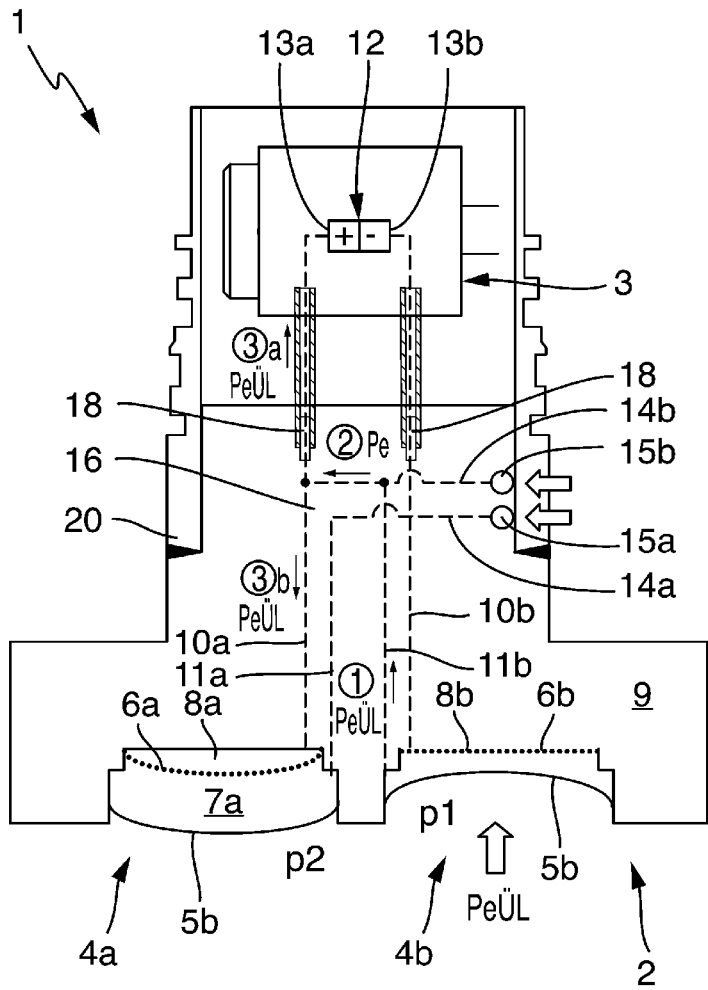
FIG. 4 shows a longitudinal section through a schematic illustration of a coplanar differential pressure transducer with overload protection, in which the coplanar adapter according to the present disclosure can be used.

FIG. 4 shows a preferred embodiment of a specific differential pressure transducer 1 with overload protection, in which the coplanar adapter 17, 19*a*; 19*b* can be used. It goes without saying that the adapter according to the invention can be used with any embodiment of a coplanar differential pressure transducer 1; it is not limited to the embodiment described below. The differential pressure transducer 1 serves to determine the differential pressure between two pressures p1, p2. The measurement of the differential pressure between two pressures p1, p2 is used for example in a pipe conduit to determine flow. A further application of a differential pressure transducer 1 is, for example, the determining of the fill level of a fluid medium located in a tank.

The differential pressure transducer 1 consists of a measuring unit 2 and a converter chamber 3. A coplanar double diaphragm system with two double membranes 4*a*, 4*b* is provided on or in an end region of the measuring unit 2 facing the process. The measuring unit 2 is arranged in the process connection 21. A differential pressure measuring cell 12 with a pressure-sensitive element 13 is arranged in the transducer chamber 3. The converter chamber 3 is located in the housing adapter 22. In the case shown, the transducer chamber 3 and the measuring unit 2 are offset from one another; the capillary tubes of the measuring unit 2 and transducer chamber 3 are connected to one another via capillary tubes.

The two double diaphragms 4*a*, 4*b* each consist of a process diaphragm 5*a*, 5*b* or a separating diaphragm 5*a*, 5*b* and an overload diaphragm 6*a*, 6*b* arranged behind the separating diaphragm 5*a*, 5*b* in the direction of action of the pressure. A first pressure chamber 7*a* is formed between the first separating diaphragm 5*a* and the first overload diaphragm 6*a*, and a first additional pressure chamber 8*a* or overpressure chamber 8*a* is formed between the first overload diaphragm 6*a* and the base body 9. Furthermore, a second pressure chamber 7*b* is formed between the second separating diaphragm 5*b* and the second overload diaphragm 6*b*, and a second additional pressure chamber 8*b* or a second overpressure chamber 8*b* is formed between the second overload diaphragm 6*b* and the base body 9.

A first connecting capillary 10*a* is assigned to the first additional pressure chamber 8*a*, and a second connecting capillary 10*b* is assigned to the second additional pressure chamber 8*b*. A first auxiliary capillary 11*a* is assigned to the first pressure chamber 7*a*. A second auxiliary capillary 11*b* is assigned to the second pressure chamber 7*b*. The pressure-transmitting coupling/intersection between the first auxiliary capillary 11*a* and the second connecting capillary 10*b* and between the second auxiliary capillary 11*b* and the first connecting capillary 10*a* is realized in the measuring unit 2 in the embodiment shown. Alternatively, as can be seen in FIG. 1, it can take place in the transducer chamber 3. It is also possible for the intersection of the capillaries to take place behind the transducer chamber 3 or in accordance with two alternatives: partially in the transducer chamber 3 and partially in the intermediate space or partially in the transducer chamber 3 and partially in the measuring unit 2.

In the embodiment shown, the pressure transfer and the limiting of the overpressure to an amount by which the pressure-sensitive element 13 is not damaged or destroyed, operate in parallel, wherein it is ensured in terms of pressure dynamics that the overpressure PeÜL is limited before it reaches the pressure measuring cell 12. The limitation of the overpressure PeÜL takes place via a correspondingly predetermined preloading of the overload diaphragms 6*a*, 6*b*. These are preloaded in such a way that in normal measuring operation they bear against the housing of the base body 9 in a form-fitting manner and over approximately the full surface and only lift off from the base body 9 of the measuring unit 2 or of the process adapter 21 when the predetermined critical limit pressure is exceeded. Up to this limit pressure, integrity of the pressure-sensitive element is ensured.

During regular measurement operation and in the initial stage when an overpressure PeÜL occurs, the overload diaphragms 6*a*, 6*b* make full surface contact with the base body 9 of the measuring unit 2. The bearing is largely form-fitting; the overload diaphragms 6*a*, 6*b* are preloaded accordingly. The measurement pressure p1, p2 passes via the separating diaphragms 5*a*, 5*b*, the pressure chambers 7*a*, 7*b*, the connecting capillaries 10*a*, 10*b* and the auxiliary capillaries 11*a*, 11*b* to the rear side of the additional pressure chambers 8*a*, 8*b* and parallel to the transducer chamber 3 or to the pressure-sensitive measuring element 13.

The overload diaphragms 6*a*, 6*b* and the measuring element 13 are hydraulically parallel, and therefore the same pressure acts on both. At the overload diaphragms 6*a*, 6*b* and the measuring element 13, the differential pressure dp is formed from $p_1$-$p_2$. The pressure-sensitive measuring element 13 is deflected as a function of the differential pressure. Since the overload diaphragms 6*a*, 6*b* are preloaded, their deflection is necessarily prevented up to a defined value. Of course, the preloading is also greater than the measurement range.

The pressure-sensitive measuring element 13 receives the pressure information for the plus side (+) via the pressure chamber 7*b* and the connecting capillaries 11*b*, 10*a*. The pressure information for the minus side (−) of the pressure-sensitive measuring element 13 is transmitted via the pressure chamber 7*a* and the connecting capillaries 11*a*, 10*b*. The effect of the parallel paths via the additional pressure chambers 8*a*, 8*b* is virtually negligible due to the preloaded and the approximately form-fitting support of the overload diaphragms 6*a*, 6*b* on the base body 9 of the measuring unit 2.

In the event of an overload, i.e., when a one-sided overpressure PeÜL occurs on the right side of the differential pressure transducer 1, the pressure on the separating diaphragm 5*b* and in the pressure chamber 7*b* increases. Since the overload diaphragm 6*b* bears against the base body 9, a pressure increase in the additional pressure chamber 8*b* is not possible. The pressure passes via the pressure chamber 7*b* to the connecting capillary 11*b* and acts via the connecting capillary 10*a* on the plus side (+) of the pressure-sensitive measuring element 13; in parallel it also acts on the rear side of the overload diaphragm 6*a* facing away from the process. If the pressure exceeds the preloading of the overload diaphragm 6*a*, the latter is deflected, and the additional pressure chamber 8*a* can receive the hydraulic fluid 16, typically a silicone oil, that is displaced out of the pressure chamber 7*b*. The pressure in the additional pressure chamber 8*a* and the downstream pressure chamber 7*a* rises continuously. The overload diaphragm 6*a* and the separating diaphragm 5*a* are deflected in the direction of the process. This procedure ends only when all oil 16 is displaced out of the pressure chamber 7*b*, and the separating diaphragm 5*b* comes to rest on the overload diaphragm 6*b* supported on the base body 9 of the measuring unit 2. As soon as this state has been reached, the pressure in the interior of the hydraulic system cannot increase further: The pressure limitation, i.e. the overload protection, takes effect.

The capillary system of the differential pressure transducer 1 is filled with transfer fluid 16 via these filling bores 15a, 15b. The filling bores 14a, 14b run laterally in the process connection 21 or in the measuring unit 2. In the embodiments shown, the filling bores 14a, 14b run parallel to the base face of the process connection 21. The position is selected such that the oil volume required for filling is as low as possible.

For this reason, the closure elements 15a, 15b are also provided as close as possible to the intersection points of the capillaries 10a, 10b, 11a, 11b. Due to the arrangement in the interior of the differential pressure transducer 1, the filling bores 14a, 14b, behind the closure elements 15a, 15b, are corrosion-protected. Furthermore, the corresponding regions of the filling bores 14a, 14b can also be potted to the outside, but this is not absolutely necessary due to the position of the filling bores 14a, 14b, which is closed off from the outside.

A preferably spherical closure element 15a, 15b, which is pressed into the filling bore 14a, 14b and is subsequently caulked, is provided in each case as a pressure-tight, gas-tight or at least liquid-tight closure. In principle, other methods for closing the openings of the filling bores 14a, 14b are also available. However, welding is viewed critically in this respect, since negative effects on the defined properties of the transfer fluid 16 can occur as a result of the temperature increase.

LIST OF REFERENCE SIGNS

1 Differential pressure transducer
2 Measuring unit
3 Transducer chamber
4a, 4b First double diaphragm, second double diaphragm
5a, 5b First separating diaphragm, second separating diaphragm
6a, 6b First overload diaphragm, second overload diaphragm
7a, 7b First pressure chamber, second pressure chamber
8a, 8b First additional pressure chamber, second additional pressure chamber
9 Base body
10a, 10b First connecting capillary, second connecting capillary
11a, 11b First auxiliary capillary, second auxiliary capillary,
12 Differential pressure measuring cell
13 Pressure-sensitive differential pressure element
14a, 14b Filling bore
15a, 15b Closure element
16 Transfer fluid/hydraulic fluid/oil
17 Ellipsoidal disk-shaped recess
18 Dynamic brake
19 Insert plate
20 Circumferential groove
21 Process connection
22 Housing adapter
23a, 23b Hardware interface
24a, 24b Customer connection
25 Weld seam
26a, 26b Opening

The invention claimed is:

1. A coplanar differential pressure transducer comprising a measuring unit including two separating diaphragms facing the process to be measured and a transducer chamber,
   wherein two pressures are applied to the separating diaphragms, the pressures being transmitted hydraulically via a corresponding capillary system to a pressure-sensitive measuring element, which is disposed in the transducer chamber,
   wherein, in its end region facing the process, the measuring unit is configured as a process connection for a hardware interface of a customer connection, wherein, in an end face of a base body of the process connection facing the process, a disk-shaped recess is adapted downstream of each of the two separating diaphragms,
   wherein each of the two disk-shaped recesses is in the form of two circles, having different radii, which intersect in an ellipsoidal structure,
   wherein two insert disks, which correspond to the ellipsoidal disk-shaped recesses, each including an opening, are configured to be mounted in the ellipsoidal disk-shaped recesses and are configured such that the process connection can be adapted to the hardware interface of the customer connection.

2. The pressure transducer of claim 1, wherein at least two pairs of different insert disks are included, which insert disks are configured such that the process connection is mountable on at least two different industry standard hardware interfaces of corresponding customer connections.

3. The pressure transducer of claim 1, wherein the ellipsoidal disk-shaped recesses and the corresponding insert disks are sized such that circumferential weld seams adapted for mounting the insert disks lie in the ellipsoidal disk-shaped recesses outside the separating diaphragms.

4. The pressure transducer of claim 1, wherein the two ellipsoidal disk-shaped recesses are arranged fully symmetrically with respect to each other.

5. The pressure transducer of claim 1, wherein the two ellipsoidal disk-shaped recesses are arranged such that they are adjacent each other with the two larger radii, while they are aligned with the two smaller radii with two opposite outer edges of the process connection.

6. The pressure transducer of claim 1, wherein, in the case of two insert disks that correspond to a first hardware interface, the opening is circular and is, in each case, located in a region of the larger radius.

7. The pressure transducer of claim 6, wherein the first hardware interface is an industry-standard 3051 interface.

8. The pressure transducer of claim 6, wherein a circumferential annular groove is disposed around each of the two circular openings.

9. The pressure transducer of claim 1, wherein, in the case of two insert disks that correspond to the first hardware interface, the circular opening is, in each case, located in a region of the smaller radius.

10. The pressure transducer of claim 9, wherein a second hardware interface is an industry-standard IEC interface.

* * * * *